Figure 1:
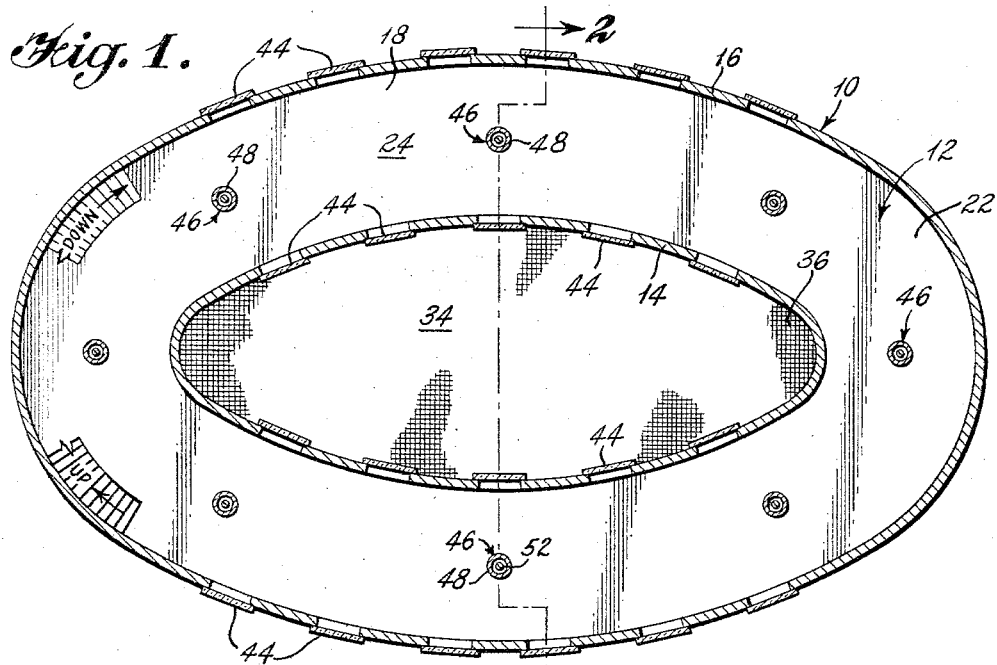

March 15, 1966 C. DOBELL 3,240,186
FLOATING AQUARIUM STRUCTURE
Filed Dec. 30, 1963

INVENTOR
Curzon Dobell

BY
Stevens, Davis, Miller & Mosher
ATTORNEYS

United States Patent Office 3,240,186
Patented Mar. 15, 1966

3,240,186
FLOATING AQUARIUM STRUCTURE
Curzon Dobell, P.O. Box 643, Nassau, Bahamas
Filed Dec. 30, 1963, Ser. No. 334,352
6 Claims. (Cl. 119—1)

This invention relates to a floating or buoyant structure and more particularly to such a structure that can be used as a Seaquarium and may be moved from place to place over water, and which structure, when positioned in a selected location, can be disposed in a fixed position.

It is an object of the present invention to provide a Seaquarium comprising a buoyant structure with a central area or space therein providing a Seaquarium section in which are disposed captive fish prevented from escaping from the area by fish net means, and which fish net means further permits the free circulation of water into the captive fish area.

It is another object of the present invention to provide a Seaquarium consisting of a buoyant structure surrounding a captive fish area, which area is in free communication with the surrounding body of water in which the Seaquarium is disposed.

It is another object of the present invention to provide a Seaquarium consisting of a floating structure that is completely seaworthy and can be towed or moved from one place to another and which has a plurality of decks which provide entertainment or recreation facilities in the structure, which decks surround a central area or space in which captive fish are maintained, and which structure has a number of observation windows therein so that the captive fish may be viewed in their natural habitat and free swimming fish, which are attracted by the captive fish and the feeding of the small captive fish, can also be observed through the windows.

It is another object of the present invention to provide a Seaquarium consisting of a completely or continuously closed loop structure provided with a water-receiving compartment or area in the center thereof, and fish net means closing off the water area from the surrounding body of water in which the structure is positioned.

It is another object of the present invention to provide a Seaquarium comprising an oval, water-tight structure with an oval shaped aquarium disposed in the center thereof in which captive fish are maintained therein by fish net means so that the surrounding body of water in which the structure is positioned is free to circulate through the net means into the captive fish area so that no particular treatment of the water in the aquarium is required and free-swimming fish can pass below the net means, which free-swimming fish are attracted by the captive fish and the feeding of them, and which aquarium is provided with observation means so that persons aboard it can readily view the captive fish and the free-swimming fish attracted by the captive fish. This structure is further provided with net means which is fine enough so that it is undetectable to viewers looking into the captive fish area and downwardly into the sea or body of water, the viewers thus having the impression that all fish, including the fish in the captive area and the fish below the fish net means, are unseparated, and the viewers will be able to see the natural habitat in which the fish live.

It is another object of the present invention to provide a Seaquarium comprising a seaworthy, completely closed loop structure with a Seaquarium area disposed centrally thereof and with ballast means for properly floating the structure at any desired level with respect to the body of water in which the structure is floated, and with hydraulic means for properly securing or positioning the structure in a fixed position at any desired location in a body of water.

It is another object of the present invention to provide a floating Seaquarium that can be moved from place to place and which has a captive fish area therein for holding captive fish, which area is in free communication with the body of water in which the Seaquarium is disposed so that there is no expense whatsoever in treating the water, feeding the fish, and transporting new specimens from their natural habitat to the Seaquarium, as is present in Seaquariums used at the present time.

Figure 2:
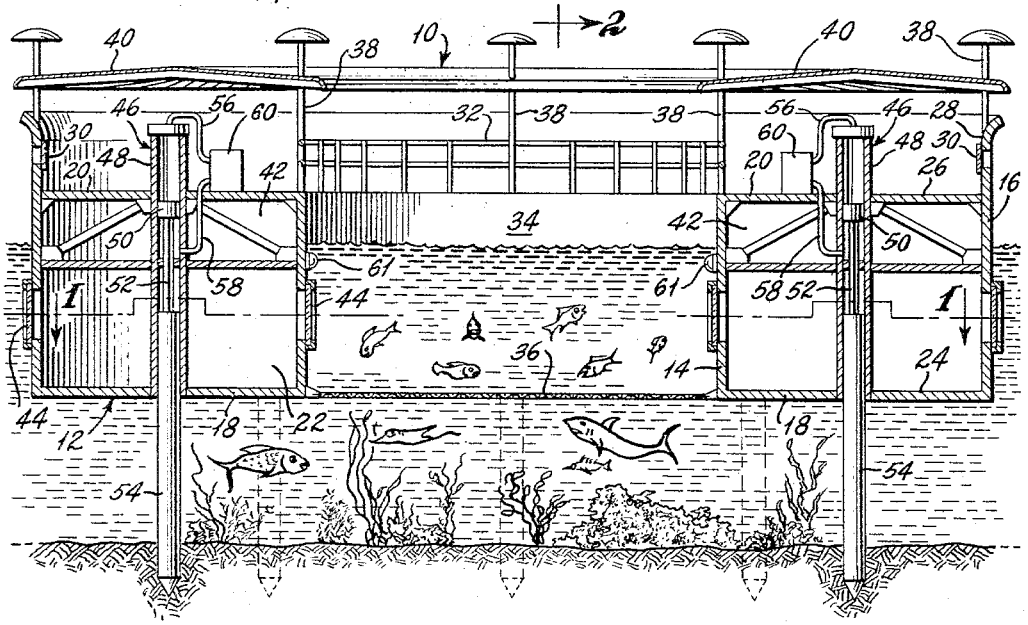

Various other objects and advantages of the present invention will be readily apparent from the following detailed description when considered in connection with the accompanying drawing forming a part thereof, and in which FIGURE 1 is a plan view taken along line 1—1 of FIGURE 2 of the Seaquarium of the present invention, illustrating the Seaquarium as having an oval or doughnut shape; and FIGURE 2 is a sectional elevation view taken along line 2—2 of FIGURE 1.

Referring to the drawings, the reference numeral 10 generally designates a Seaquarium provided with a continuous or completely closed loop structure 12. The structure 12, as can readily be seen from the drawing, is oval shaped and is provided with an inner oval-shaped wall or bulkhead 14 and an outer oval-shaped wall or bulkhead 16 disposed in spaced relationship with the inner wall 14 to provide a large area therebetween for persons on board the structure to be entertained, have recreation facilities and observe the fish in the surrounding body of water in which the Seaquarium is floated. The vertical walls 14 and 16 are connected together at the bottom by a horizontal member 18, and are connected together at the top by an upper deck member 20. The continuous closed loop or water-tight compartment 22 defined by walls 14, 16, 18 and 20 are provided with an observation deck 24 adjacent the bottom 18 and an open promenade deck 26, the bottom of which is formed by the top member 20. The promenade deck 26 is preferably provided with a closed continuous railing 28 with spaced portholes 30 therein. The railing 28 may be an upward extension of the outer wall 16, as shown, or it may be formed in other well-known manners. An open railing 32 is disposed around the upper edge of the inner wall 14 for readily observing the captive fish compartment or area 34, defined by the inner wall 14 and an open mesh or net 36 connected across the bottom of the member 14.

The upper promenade deck 26 is also provided with a number of lamp posts 38 and may have connected thereto a canvas roof 40 which will give protection to the people on the deck should inclement weather occur.

A plurality of water ballast tanks 42 are provided below the promenade deck and can be readily filled with water by any well known means not shown.

The lower observation deck 22 is provided with spaced observation windows 44 therein in the inner and outer walls 14 and 16 of the structure, so that the fish in the body of water in which the Seaquarium is floated can be readily observed.

A plurality of hydraulic jack means 46 are provided in the Seaquarium and are spaced with respect to each other around the entire structure. The hydraulic jack means consists of a vertical cylinder 48 extending through the bottom member 18 and above the deck member 20. A slidable piston member 50 having a plunger 52 is disposed in the cylinder 48 for driving a jack or pile member 54 into the bottom of the sea. Each hydraulic jack means is provided with hydraulic pressure lines 56 and 58 for supplying hydraulic fluid to opposite sides of the piston 50 from a constant-pressure hydraulic system 60 for lowering the jack or pile member 54 into the sea bottom when it is desired to fix the Seaquarium in a stationary position and for raising the jack members out of the sea bottom when it is desired to move the Seaquarium to a new location. The Seaquarium is moved from place to place by an suitable means, such as a tugboat and the like.

It will be noted that the captive fish area 34 is provided with a number of underwater lights 61 for illuminating the captive fish area and portions of the body of water located below the fish net 36. The fish net 36 may be made of any well-known material and the net should be sufficiently fine so that it is undetectable to viewers looking out of the observation windows 44 and over the railing 32 so that the viewers will gain the impression that all the fish, that is, those in the captive fish area and those below the net 36 and in the surrounding body of water, are unseparated, and the viewers will be able to see the fish in their natural habitat. The net 36 may be made of stainless steel or glass fiber filaments, or nylon, or any other suitable material.

The Sequarium of the present invention is normally floated at the level indicated in the drawings, and when it is fixed in position the piles 54 are driven into the sea bottom and the whole structure is raised just sufficiently so that it will not be disturbed by tides or waves. It will also be noted that the structure is positioned at a level where the observation windows 44 remain below the water surface.

The power for the lamps and the constant-pressure hydraulic system and other facilities in the Seaquarium can be supplied by any well-known means, not shown, and carried in the Seaquarium.

From the foregoing description it will be seen that the present invention provides a floating Seaquarium that can be moved from one place to another and can be disposed in a fixed position, which Seaquarium has a captive fish area in free communication with the body of water below and surrounding the Seaquarium so that it eliminates the cost of water treatment and the periodic feeding of the captive fish attracting free-swimming fish in the surrounding body of water, which free-swimming fish can also be viewed by persons aboard the Seaquarium.

It is also apparent that the Seaquarium of the present invention can be readily set over coral reefs and the like in order to take full advantage of the view of sea plants and shell fish on the bottom of the sea.

The present invention also provides a floating Seaquarium in which the high operating expenses of feeding unusual types of fish and transporting new specimens of fish from their natural habitat to a land-based Seaquarium is eliminated since the present invention provides a Seaquarium which is, in effect, carried to the unique specimen of fish in different portions of the sea for ready observation thereof, by utilizing a structure with a captive fish area which will attract these unusual specimens of fish and in which the feeding of the captive fish will also attract these unusual or unique specimens of fish.

Having fully described my invention, it is to be understood that I do not wish to be limited to the details herein set forth, but my invention is of the full scope of the appended claims.

What I claim is:
1. A floating structure for underwater observation comprising an oval structure having vertical inner and outer walls and top and bottom members connecting said vertical walls to form a water-tight compartment, a fish net disposed across the bottom of said inner wall to form a captive fish area in free communication with the body of water in which said structure is disposed, a plurality of fish observation windows disposed in said inner and outer walls, and hydraulic jack means extending in a vertical direction through said compartment including a cylinder with a slidable piston therein, a piston plunger connected to said piston, and a vertical jack pile connected to the lower end of said plunger for raising and lowering said compartment to maintain said windows below the water surface.

2. A floating structure for underwater observation comprising inner and outer spaced vertical perimetric walls, top and bottom members connecting said walls to form a water-tight compartment, a plurality of fish observation windows disposed in said walls, a mesh net member disposed across the bottom of said inner wall providing a captive fish space, and jack means attached to said structure for embedding into the sea bottom to raise and lower said structure to predetermined levels.

3. The structure of claim 2 wherein said compartment is provided with an observation deck and a promenade deck, and said net is made of stainless steel.

4. A floating structure for underwater observation comprising oval-shaped vertical inner and outer walls and oval-shaped top and bottom members connecting said vertical walls to form a water-tight compartment, a fish net disposed across the bottom of said inner wall to form a captive fish area in free communication with the body of water in which said structure is disposed, a plurality of fish observation windows disposed in said inner and outer walls, and jack means attached to said structure for embedding into the sea bottom to raise and lower said structure to predetermined levels.

5. A floating structure for underwater observation comprising inner and outer spaced vertical perimetric walls, top and bottom members connecting said walls to form a water-tight compartment, a plurality of fish observation windows disposed in said inner walls, a mesh net member disposed across the bottom of said inner wall providing a captive fish space, and jack means attached to said structure for embedding into the sea bottom to raise and lower said structure to predetermined levels.

6. The structure of claim 2 wherein said jack means are hydraulically operated.

References Cited by the Examiner

UNITED STATES PATENTS

| 165,639 | 7/1875 | Wenmacker | 119—5 |
| 385,656 | 7/1888 | Belisle | 114—66 |
| 1,048,194 | 12/1912 | Mitchell | 61—3 |
| 1,444,367 | 2/1923 | Brolliar | 119—5 |
| 2,203,565 | 6/1940 | Field | 9—1 |
| 2,334,992 | 11/1943 | Crake | 61—46.5 |

FOREIGN PATENTS 22,335 10/1913 Great Britain.

SAMUEL KOREN, *Primary Examiner*.

ALDRICH F. MEDBERY, *Examiner*.